(12) United States Patent
Yoon (10) Patent No.: US 9,364,808 B2
(45) Date of Patent: Jun. 14, 2016

(54) APPARATUS AND METHOD FOR REDUCING CARBON DIOXIDE USING SOLAR LIGHT

(71) Applicant: SOGANG UNIVERSITY RESEARCH FOUNDATION, Seoul (KR)

(72) Inventor: Kyung Byung Yoon, Seoul (KR)

(73) Assignee: Sogang University Research Foundation, Seoul (KR)

( * ) Notice: Subject to any disclaimer, the term of this patent is extended or adjusted under 35 U.S.C. 154(b) by 0 days.

(21) Appl. No.: 14/261,012

(22) Filed: Apr. 24, 2014

(65) Prior Publication Data

US 2014/0235736 A1  Aug. 21, 2014

Related U.S. Application Data

(63) Continuation of application No. PCT/KR2012/008754, filed on Oct. 24, 2012.

(30) Foreign Application Priority Data

Oct. 24, 2011 (KR) .......................... 10-2011-0108891
Oct. 24, 2011 (KR) .......................... 10-2011-0108900

(51) Int. Cl.
*B01J 8/00*     (2006.01)
*B01J 19/00*    (2006.01)
*B01J 19/08*    (2006.01)
*B01J 19/12*    (2006.01)
(Continued)

(52) U.S. Cl.
CPC ................ *B01J 8/008* (2013.01); *B01J 19/127* (2013.01); *B01J 35/004* (2013.01); *B01J 2219/0892* (2013.01); *B01J 2219/1242* (2013.01)

(58) Field of Classification Search
CPC .............. B01J 8/00; B01J 8/008; B01J 19/00; B01J 19/08; B01J 19/12; B01J 19/122; B01J 19/127; B01J 19/24; B01J 23/70; B01J 23/74; B01J 23/745; B01J 23/89–23/8933; B01J 35/00; B01J 35/002; B01J 35/004; B01J 2219/08; B01J 2219/0873; B01J 2219/0892; B01J 2219/12–2219/1209; B01J 2219/1221; B01J 2219/1242; C07C 27/00–27/06; C07C 29/15; C07C 29/159; C07C 31/00–31/04; C01B 31/00; C01B 31/18; C01B 31/20
See application file for complete search history.

(56) References Cited

U.S. PATENT DOCUMENTS

2007/0282021 A1* 12/2007 Campbell .................... 518/726
2009/0313886 A1* 12/2009 Hinman et al. ................ 44/302
2010/0065043 A1*  3/2010 Liu et al. ...................... 126/655

FOREIGN PATENT DOCUMENTS

JP       02-286639      11/1990
JP       05-085713       4/1993
(Continued)

OTHER PUBLICATIONS

Int'l. Search Report issued in Int'l. App. No. PCT/KR2012/008754, mailed Mar. 15, 2013.
(Continued)

*Primary Examiner* — Natasha Young
(74) *Attorney, Agent, or Firm* — Greer Burns & Crain Ltd.

(57) ABSTRACT

The present disclosure relates to an apparatus for a reduction reaction of carbon dioxide using solar energy and a reducing method of carbon dioxide for reacting carbon dioxide gas and hydrogen gas with each other by using solar energy.

18 Claims, 6 Drawing Sheets

(51) Int. Cl.
  *B01J 19/24* (2006.01)
  *B01J 35/00* (2006.01)
  *C01B 31/00* (2006.01)
  *C01B 31/18* (2006.01)
  *C01B 31/20* (2006.01)
  *B01J 23/70* (2006.01)
  *B01J 23/74* (2006.01)
  *B01J 23/745* (2006.01)
  *B01J 23/89* (2006.01)
  *C07C 27/00* (2006.01)
  *C07C 27/02* (2006.01)
  *C07C 27/04* (2006.01)
  *C07C 27/06* (2006.01)
  *C07C 29/15* (2006.01)
  *C07C 29/159* (2006.01)
  *C07C 31/00* (2006.01)
  *C07C 31/02* (2006.01)
  *C07C 31/04* (2006.01)

(56) References Cited

FOREIGN PATENT DOCUMENTS

| JP | 06-001734 | 1/1994 |
| JP | 2004-059507 | 2/2004 |
| JP | 2009-034654 | 2/2009 |

OTHER PUBLICATIONS

Myung-Seok Jeon et al., "The photocatalytic water splitting into H2 and O2 mimicking a Z-scheme mechanism", Journal of the Korean Solar Energy Society, vol. 23. No. 4. Dec. 2003.

Jeffrey C. S. Wu et al, "Photo reduction of $CO_2$ to methanol via $TiO_2$ photocatalyst", International Journal of Photoenergy, vol. 7. Dec. 2015.

* cited by examiner

APPARATUS AND METHOD FOR REDUCING CARBON DIOXIDE USING SOLAR LIGHT

CROSS-REFERENCE TO RELATED APPLICATIONS

This application is a continuation of International Application No. PCT/KR2012/008754, now WO 2013/062304, filed on Oct. 24, 2012, claiming the priority based on Korean Patent Application No. 10-2011-0108891 filed on Oct. 24, 2011 and Korean Patent Application No. 10-2011-0108900 filed on Oct. 24, 2011, the contents of all of which are incorporated herein by reference in their entirety for all purposes.

TECHNICAL FIELD

The embodiments described herein pertain generally to an apparatus and a method for reducing carbon dioxide using solar light.

BACKGROUND ART

Photosynthesis is a reaction for converting carbon dioxide and water into oxygen and starch by using solar light as energy. Such photosynthesis actively occurs in green plants and photosynthesis bacteria. Contrary to the photosynthesis in the realm of nature, artificial photosynthesis is a reaction for converting carbon dioxide and water into oxygen, liquid fuel, etc., by using solar light as energy.

In the chemical aspect, carbon dioxide ($CO_2$) and water ($H_2O$) are materials having very low potential energy, while fuel and oxygen are materials having relatively high potential energy. Plants in the realm of nature convert carbon dioxide and water into carbohydrate and oxygen ($O_2$) by using solar energy through photosynthesis. Once the converted carbohydrate and oxygen are reacted once again, they are converted back into carbon dioxide and water. Heat equal to the difference in potential energy between the two reaction materials is discharged outward.

Meanwhile, human beings have obtained energy through combustion of fossil fuel, that is, a reaction for reacting fossil fuel with oxygen to produce carbon dioxide and water. As a result, a concentration of carbon dioxide in the air is increasing every day. This has become a primary cause for global warming. The global warming is being faster and has been regarded as one of the critical factors of the global environmental problems. Accordingly, there have been worldwide efforts to raise applicability of renewable energy such as solar energy, water power, wind power, tidal energy, geothermal heat, bio fuel, etc., instead of the fossil fuel. Among the energy, solar energy is the most promising renewable energy.

As a conventionally developed method for utilizing solar energy, there is a method for converting solar heat and solar light into electric energy. However, of the electric power produced throughout the world, the electric power produced by using solar energy is too small in an amount to be ignored. Moreover, a solar cell has already reached the limit of its efficiency, and the unit price of production of solar cells is increasing. Accordingly, the necessity to realize artificial photosynthesis for producing useful materials by using solar light, water and carbon dioxide is increasing.

However, the artificial photosynthesis has not been realized even at the level of a laboratory despite the fact that many scientists have put forth their efforts for the last century. For example, Japanese Patent Publication No. 2009-034654 describes a method for producing a methane gas by reacting carbon monoxide, carbon dioxide, or a mixture gas thereof with a hydrogen gas under the presence of an iron group transition element, but is disadvantageous in that a yield of the methane gas is poor. In addition, the same Japanese patent publication does not recognize a specific apparatus for realizing photosynthesis. Accordingly, success in researching an apparatus for realizing the artificial photosynthesis is expected to greatly contribute to improvement of global environment and development of scientific technologies.

DISCLOSURE OF THE INVENTION

Problems to be Solved by the Invention

In view of the foregoing problems, example embodiments provide an apparatus and a method for reducing carbon dioxide for reacting carbon dioxide gas and hydrogen gas with each other by using solar energy.

However, the problems sought to be solved by the present disclosure are not limited to the above description and other problems can be clearly understood by those skilled in the art from the following description.

Means for Solving the Problems

In a first aspect of the present disclosure, there is provided an apparatus for a reduction reaction of carbon dioxide, including: a solar collecting member that absorbs solar heat energy; a reduction reaction member of carbon dioxide, heated by solar heat energy; and a reactant supplying member and a product outlet member, which are connected to the reduction reaction member of carbon dioxide, wherein hydrogen gas and carbon dioxide gas are injected into the reduction reaction member of carbon dioxide via the reactant supplying member to be reacted with each other in the presence of a metal catalyst supported on a metal oxide support loaded into the reduction reaction member of carbon dioxide.

In a second aspect of the present disclosure, there is provided an apparatus for a reduction reaction of carbon dioxide, including: a reduction reaction member of carbon dioxide, in which a photocatalyst is loaded; and a reactant supplying member and a product outlet member, which are connected to the reduction reaction member of carbon dioxide, wherein carbon dioxide gas and hydrogen gas are injected into the reduction reaction member of carbon dioxide via the reactant supplying member to be reacted with each other within the reduction reaction member of carbon dioxide under irradiation of solar light.

In accordance with the present example embodiment, the apparatus for a reduction reaction of carbon dioxide further includes a water-splitting reaction member.

In accordance with the present example embodiment, the water-splitting reaction member generates oxygen and hydrogen through splitting of water by a solar cell, the generated oxygen is removed, and the generated hydrogen is supplied into the reduction reaction member of carbon dioxide.

In accordance with the present example embodiment, the water-splitting reaction member converts seawater into fresh water and generates oxygen and hydrogen through splitting of the fresh water by a solar cell, the generated oxygen is removed, and the generated hydrogen is supplied into the reduction reaction member of carbon dioxide.

In accordance with the present example embodiment, the reactant supplying member includes a carbon dioxide gas supplier and a hydrogen gas supplier.

In accordance with the present example embodiment, the apparatus for a reduction reaction of carbon dioxide, further includes a water supplier connected to the reduction reaction member of carbon dioxide.

In accordance with the present example embodiment, the solar collecting member that absorbs solar heat energy includes a solar light collector.

In accordance with the present example embodiment, the reduction reaction member of carbon dioxide includes an outer wall in a vacuum state.

In accordance with the present example embodiment, the solar collecting member is manufactured by using a solar light absorbing material or subject to surface treatment by using a solar light absorbing material.

In accordance with the present example embodiment, the solar light absorbing material includes a member selected from the group consisting of an iron oxide, a chrome oxide, a zirconium oxide, a fluoropolymer composition, graphene, a graphene oxide, a carbon nanotube, graphite, and combinations thereof.

In accordance with the present example embodiment, the photocatalyst includes a metal compound selected from the group consisting of a metal oxide, a metal carbide, a metal oxycarbide, and combinations thereof.

In accordance with the present example embodiment, the metal oxide includes an oxide containing at least one species of a metal selected from the group consisting of a transition metal, a non-transition metal and combinations thereof.

In accordance with the present example embodiment, the metal oxide includes a metal oxide doped with a member selected from the group consisting of a non-metal element, an alkali metal element, an alkali earth metal element, and combinations thereof.

In accordance with the present example embodiment, the metal oxide includes a member selected from the group consisting of $TiO_2$, $ZnO$, $Ta_2O_5$, $ZrO_2$, $WO_3$, an iron oxide, a manganese oxide, a copper oxide, a cobalt oxide, a nickel oxide, a chrome oxide, a molybdenum oxide, a vanadium oxide, an indium oxide, a lead oxide, $ZnCrO_4$, $ZnFe_2O_4$, $MnTiO_3$, $CaTiO_3$, $BaTiO_3$, $SrTiO_3$, $BiVO_4$, $Pb_4Ti_3$, $CdIn_2O_4$, $Fe_2TiO_5$, $CrNbO_4$, $Cr_2Ti_2O_7$; the metal oxide described above which is doped with N, P, As, C, Y, V, Mo, Cr, Cu, Al, Ta, B, Ru, Mn, Fe, Li, Nb, In, Pb, Ge, C, N, S, Sb, or combinations thereof; and combinations thereof.

In accordance with the present example embodiment, the metal carbide includes SiC or a carbide of a transition metal.

In accordance with the present example embodiment, the metal oxycarbide includes SiOC or an oxycarbide of a transition metal.

In accordance with the present example embodiment, the photocatalyst further includes a metal particle.

In accordance with the present example embodiment, the metal catalyst is in a metal particle form.

In accordance with the present example embodiment, the metal particle includes a member selected from the group consisting of Fe, Ru, Rh, Co, Ir, Os, Pt, Pd, Ni, Au, Ag, Cu, Co, Zn, Ti, V, Mn, Sn, In, Pb, Cd, Ga and combinations thereof.

In a third aspect of the present disclosure, there is provided a reducing method of carbon dioxide, including:

loading a photocatalyst into a reduction reaction member of carbon dioxide including a reactant supplying member;

splitting water into hydrogen gas and oxygen gas in a water-splitting reaction member, which includes a solar cell and is connected to the reactant supplying member; and injecting the hydrogen gas and carbon dioxide gas into the reduction reaction member of carbon dioxide via the reactant supplying member to react the hydrogen gas and the carbon dioxide gas with each other under irradiation of solar light.

In a fourth aspect of the present disclosure, there is provided a reducing method of carbon dioxide, including:

loading a photocatalyst into a reduction reaction member of carbon dioxide;

heating the reduction reaction member of carbon dioxide by using solar heat energy transferred from a solar collecting member that absorbs solar heat energy; and injecting hydrogen gas and carbon dioxide gas into reduction reaction member of carbon dioxide to react the hydrogen gas and the carbon dioxide gas with each other.

Effect of the Invention

In accordance with example embodiments, the apparatus for a reduction reaction of carbon dioxide can easily reduce carbon dioxide by using solar light or solar heat.

By heating the apparatus for a reduction reaction of carbon dioxide through solar energy, it is possible to easily reduce carbon dioxide. Through the reduction of carbon dioxide, it is possible to effectively produce liquid fuels such as CO, hydrocarbons, ketones, aldehydes, alcohols, etc. Especially, the solar collecting member of the apparatus for a reduction reaction of carbon dioxide is manufactured by a solar light absorbing material or subject to surface treatment by a solar light absorbing material such that it can effectively absorb solar light to convert the solar light into thermal energy, and can easily increase a temperature of the reduction reaction member of carbon dioxide of the apparatus for a reduction reaction of carbon dioxide to a temperature at which reduction of carbon dioxide is possible. Accordingly, by using the apparatus for a reduction reaction of carbon dioxide using solar light in accordance with example embodiments, it is possible to improve efficiency of production processes for fuel materials through reduction of carbon dioxide and contribute to commercialization of the fuel materials.

In addition, it is possible to easily reduce carbon dioxide by using a photocatalyst, and through the reduction of carbon dioxide, it is possible to effectively produce liquid fuels such as CO, hydrocarbons, ketones, aldehydes, alcohols, etc. Especially, since hydrogen for reduction of carbon dioxide is produced by splitting of water by a solar cell, there is no need to worry about the environmental pollution. By adding water during the reduction process of carbon dioxide, it is possible to further improve the reduction of carbon dioxide. Accordingly, by using the apparatus for a reduction reaction of carbon dioxide in accordance with example embodiments, it is possible to improve efficiency of production processes for fuel materials through reduction of carbon dioxide and contribute to commercialization of the fuel materials.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Through the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" means that one or more other components, steps, operations, and/or the existence or addition of elements are not excluded in addition to the described components, steps, operations and/or elements. The terms "about or approximately" or "substantially" used in this document are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Throughout the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, the term "A and/or B" means "A or B" or "A and B."

Although specific terminology has been used in this disclosure, it will be apparent to one of ordinary skill in the art that different terminology may used to describe the same features, and such different terminology may appear in other applications.

Hereinafter, an apparatus and a method for reducing carbon dioxide using solar heat in accordance with an example embodiment are described in detail with reference to FIG. 1 to FIG. 4.

Figure 1:
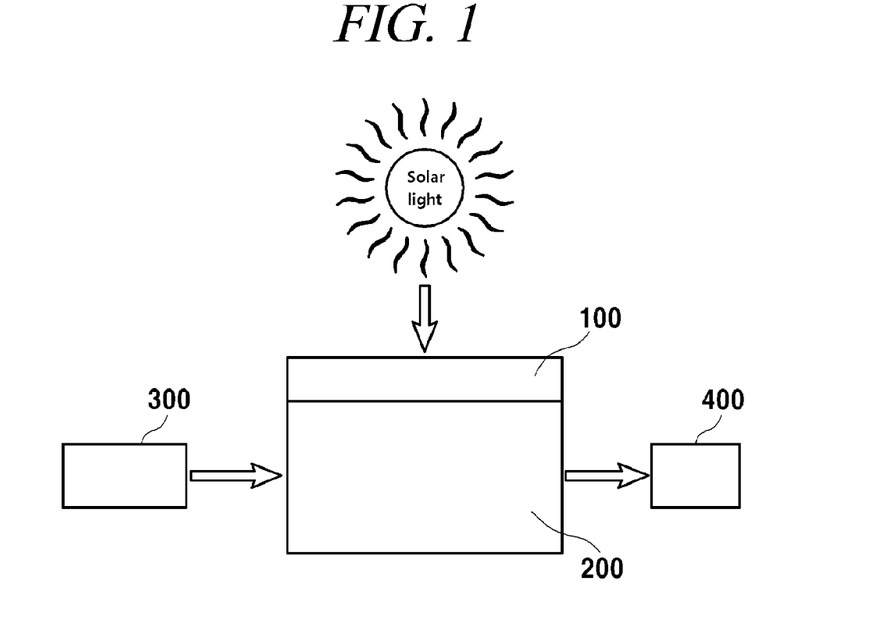
FIG. 1 is a schematic diagram of an apparatus for a reduction reaction of carbon dioxide in accordance with an example embodiment.

The apparatus for a reduction reaction of carbon dioxide in accordance with an example embodiment may include a solar collecting member 100 that absorbs solar heat energy, a reduction reaction member of carbon dioxide 200 heated by solar heat energy, and a reactant supplying member 300 and a product outlet member 400, which are connected to the reduction reaction member of carbon dioxide 200 (refer to FIG. 1).

Solar light is incident through the solar collecting member 100. The solar collecting member 100 may be connected directly to the reduction reaction member of carbon dioxide 200. For example, the solar collecting member 100 may be positioned on a front surface of the reduction reaction member of carbon dioxide 200, but is not limited thereto. The solar collecting member 100 may not be connected directly, but may be separated from the reduction reaction member of carbon dioxide 200. In this case, the reduction reaction member of carbon dioxide 200 may take heat absorbed by the solar collecting member 100 so as to be heated. For example, the solar collecting member 100 may include a solar light collector (not illustrated) for collecting solar light, but is not limited thereto. For the solar light collector, any commodity that can effectively collect solar light may be used without limitation in a shape or material thereof. The solar light collector may be of, for example, a plane plate shape, a trough shape, and a parabola shape, etc., and the material for the solar light collector may include, for example, glass, silicon, a thermoplastic film, and a thermosetting film, etc. However, the shape and the material of the solar light collector are not limited thereto.

The solar collecting member 100 may absorb solar heat energy from incident solar light to perform the function of a heater that heats the reduction reaction member of carbon dioxide 200. In an example embodiment, in order to effectively absorb solar heat energy, the solar collecting member 100 may be painted in black, but is not limited thereto. In addition, in order to increase the contact area with solar light, the solar collecting member 100 may have, for example, protrusions and recesses, but is not limited thereto.

The solar collecting member 100 may be manufactured by using a solar light absorbing material or subject to surface treatment by using a solar light absorbing material, but is not limited thereto. Solar light is absorbed by the solar light absorbing material, thereby increasing a temperature of the solar collecting member 100. For the solar light absorbing material, any material that absorbs and converts solar light into heat energy may be used without limitation. For example, the solar light absorbing material may include a member selected from the group consisting of an iron oxide, a chrome oxide, a zirconium oxide, a fluoropolymer composition, graphene, a graphene oxide, a carbon nanotube, graphite, and combinations thereof, but is not limited thereto.

As the solar collecting member 100 absorbs solar heat energy so as to be heated, the reduction reaction member of carbon dioxide 200 can be heated at the same time. The reduction reaction member of carbon dioxide 200 may be heated to a temperature, at which carbon dioxide gas and hydrogen gas can be reacted with each other to be reduced. For example, the reduction reaction member of carbon dioxide 200 may be heated to approximately 100° C. or higher, approximately 150° C. or higher, approximately 200° C. or higher, approximately 250° C. or higher, or approximately 300° C. or higher, or may heated to approximately 1,000° C. or less, approximately 950° C. or less, approximately 900° C. or less, approximately 850° C. or less, or approximately 800° C. or less, but is not limited thereto.

The temperature of the heated reduction reaction member of carbon dioxide 200 may be reduced as a result of contact with the air. In order to keep the internal temperature of the reduction reaction member of carbon dioxide 200 at a certain level or higher, the reduction reaction member of carbon dioxide 200 may be surrounded with an outer wall 220 that cuts off contact with the outside air. The inside space of the outer wall 220 may be in the vacuum state, but is not limited thereto. If the inside space of the outer wall 220 is in the vacuum state, the high temperature of the reduction reaction member of carbon dioxide 200 can be kept over long time thanks to the superior thermal insulation effect of the vacuum. In order to easily absorb light, the outer wall 220 may have an outer surface painted in black, but is not limited thereto (refer to FIG. 2).

Hydrogen gas and carbon dioxide gas are injected via the reactant supplying member 300. The hydrogen gas and the carbon dioxide gas may be reacted with each other in the presence of a metal catalyst supported on a metal oxide support loaded into the reduction reaction member of carbon dioxide 200, and the carbon dioxide gas may be reduced as a result of the reaction so that liquid fuels such as CO, hydrocarbons, ketones, aldehydes, alcohols, etc. may be produced, without being limited thereto. The produced liquid fuel may be discharged via the product outlet member 400.

Figure 2:
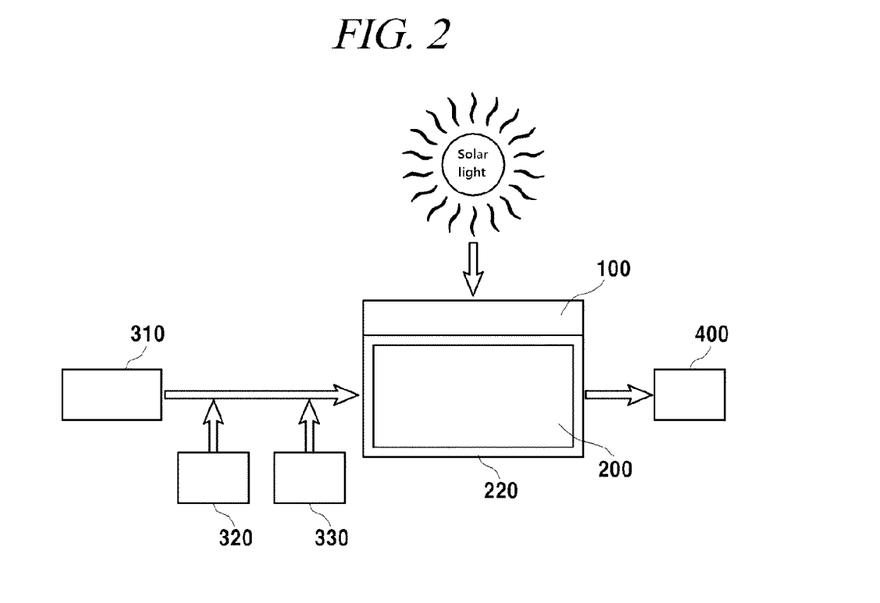
FIG. 2 is a schematic diagram of an apparatus for a reduction reaction of carbon dioxide in accordance with an example embodiment.

The reactant supplying member 300 may include a hydrogen gas supplier 310 and a carbon dioxide gas supplier 320 (refer to FIG. 2). The hydrogen gas may be supplied to the reduction reaction member of carbon dioxide 200 via the hydrogen gas supplier 310, and the carbon dioxide gas may be supplied to the reduction reaction member of carbon dioxide 200 via the carbon dioxide gas supplier 320. The hydrogen gas and the carbon dioxide gas to be supplied into the reduction reaction member of carbon dioxide 200 may be each independently supplied or mixed in advance to be supplied, but are not limited thereto.

The reactant supplying member 300 may further include a water supplier 330. Water may be additionally supplied to the reduction reaction member of carbon dioxide 200 by the water supplier 330, such that the hydrogen gas and the carbon dioxide gas can be more easily reacted with each other. An amount of the water to be additionally supplied may be above approximately 0 ppm to approximately 100 ppm or less based on a total volume of the hydrogen gas and the carbon dioxide gas to be supplied to the reduction reaction member of carbon dioxide 200, but is not limited thereto. The water to be additionally supplied may be sprayed or supplied in a steam form into the reduction reaction member of carbon dioxide 200, but is not limited thereto.

The hydrogen gas supplier 310 may be connected to a water-splitting reaction member 500, but is not limited thereto. The water-splitting reaction member 500 may include a solar cell 510, a water splitting reactor 520, and a separator (not illustrated) connected to the water splitting reaction member 500, the separator may include a hydrogen gas outlet 531 and an oxygen gas outlet 532, and the hydrogen gas outlet 531 may be connected to the hydrogen gas supplier 310, without being limited thereto (refer to FIG. 3 and FIG. 4).

Figure 3:
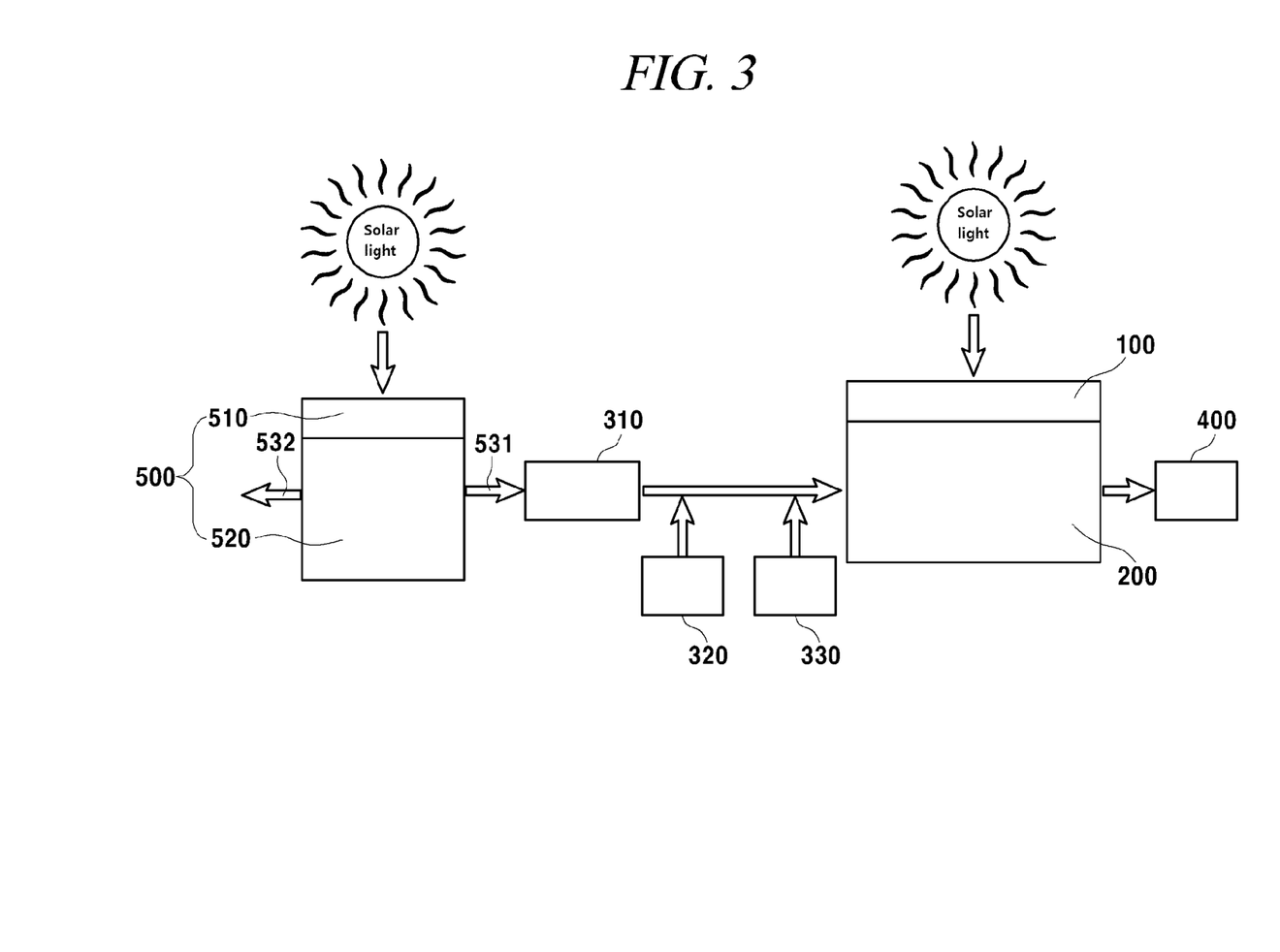
FIG. 3 is a schematic diagram of an apparatus for a reduction reaction of carbon dioxide in accordance with an example embodiment.
Figure 4:
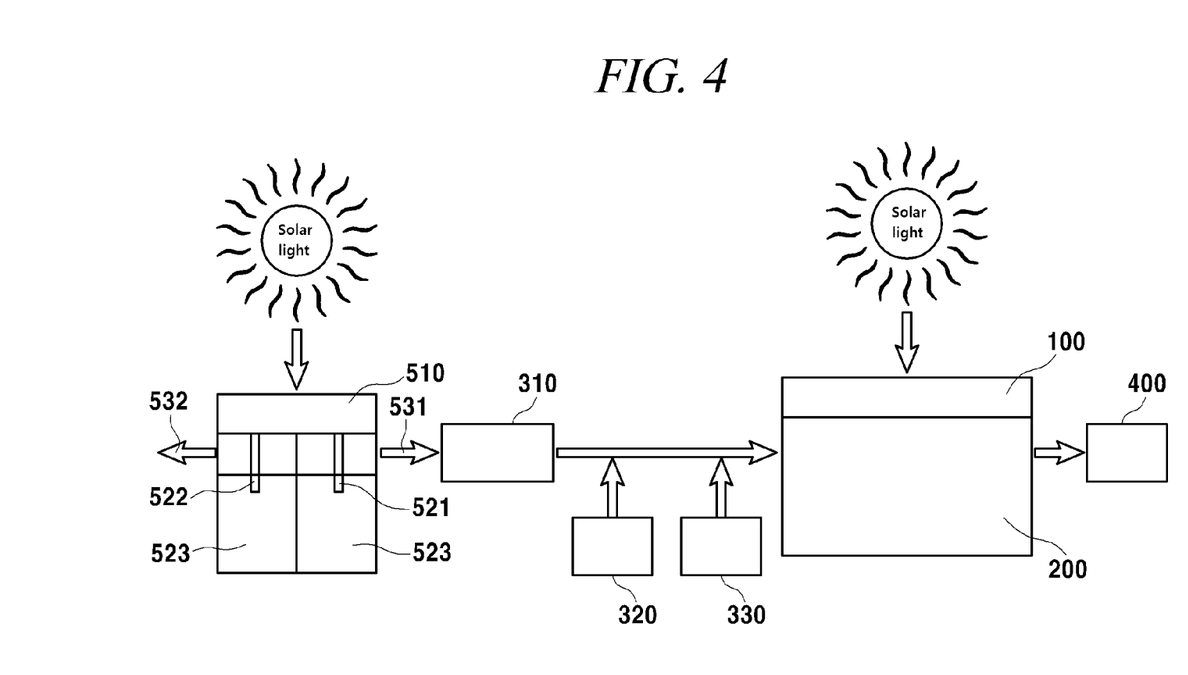
FIG. 4 is a schematic diagram of an apparatus for a reduction reaction of carbon dioxide in accordance with an example embodiment.

In the water-splitting reaction member 500, water 523 may be electrolyzed by the solar cell 510, thereby generating a hydrogen gas and an oxygen gas. The produced hydrogen gas is discharged by the hydrogen gas outlet 531, and the discharged hydrogen gas is supplied to the hydrogen gas supplier 310.

Specifically, solar light is irradiated to the solar cell 510 of the water-splitting reaction member 500 such that a photoelectromotive force is generated from the solar cell 510. The generated photoelectromotive force is applied to the water 523 by a first electrode 521 and a second electrode 522, and accordingly, the water 523 is split into hydrogen ions ($H^+$) and oxygen ions ($O^{2-}$). Simultaneously, the oxygen ions are oxidized on a surface of the second electrode 522 thereby generating an oxygen gas ($O_2$). The generated oxygen gas may be discharged into the air by the oxygen gas outlet 532. The hydrogen ions move toward the first electrode 521 to be reduced on the surface of the first electrode 521 thereby generating a hydrogen gas. The generated hydrogen gas is discharged by the hydrogen gas outlet 531 to be supplied to the hydrogen gas supplier 310.

For example, the water-splitting reaction member 500 may include a photocatalyst, a water splitting reactor 520, and a separator connected to the water-splitting reaction member 500, the photocatalyst may be formed within the water splitting reactor 520, the separator may include a hydrogen gas outlet and an oxygen gas outlet, and the hydrogen gas outlet may be connected to the hydrogen gas supplier, without being limited thereto. In the water splitting reactor, water may be separated into hydrogen and oxygen by the photocatalyst. The hydrogen and the oxygen are formed in a gas mixture form, and may be separated into the hydrogen gas outlet and the oxygen gas outlet, respectively, through a certain separation process. The separation process is not limited, and may be, for example, separation by a porous separation film, and separation by capillary condensate flow, etc., without being limited thereto. The photocatalyst is not limited, and may be, for example, a titanium-based compound, a zinc-based compound, a sulfide-based compound, a niobium-based compound, combinations thereof or others, without being limited thereto.

In accordance with an example embodiment, the water-splitting reaction member 500 may further include a seawater desalination apparatus (not illustrated). Accordingly, the water 523 may be seawater. The seawater is converted into fresh water via the seawater desalination apparatus (not illustrated), and the fresh water is electrolyzed to generate a hydrogen gas and an oxygen gas.

The seawater desalination apparatus (not illustrated) may desalinate seawater through a reverse osmosis method or a vaporization method, but is not limited thereto. For example, the seawater desalination apparatus (not illustrated) may include a vaporizer that vaporizes seawater, a condenser that liquefies a vaporized steam, a solar collector, and a heat storage tank that stores solar heat. In the seawater desalination apparatus (not illustrated), the seawater is circulated and heated within the heat storage tank heated by solar energy absorbed by the solar collector. The heated seawater may be vaporized in the vaporizer to form steam, and the steam may be liquefied in the condenser to be converted into fresh water.

The hydrogen gas and carbon dioxide gas supplied to the reduction reaction member of carbon dioxide 200 are reacted with each other under the presence of a metal catalyst supported on a metal oxide support loaded into the reduction reaction member of carbon dioxide 200. As a result of the reaction, the carbon dioxide gas is reduced so that liquid fuels such as CO, hydrocarbons, ketones, aldehydes, alcohols, etc. can be produced. The reaction within the reduction reaction member of carbon dioxide 200 may be represented, for example, as Reaction Formulas 1 and 2 below, but is not limited thereto.

$$CO_2 + 4H_2 \rightarrow CH_4 + 2H_2O \qquad \text{[Reaction Formula 1]}$$

$$CO_2 + H_2 \rightarrow CO + H_2O \text{ (first reaction)}$$

$$CO + 2H_2 \rightarrow CH_3OH \text{ (second catalyst reaction)} \qquad \text{[Reaction Formula 2]}$$

In accordance with an example embodiment, the metal catalyst may be supported in a particle form on the metal oxide support. The metal catalyst may have a particle form in a nanometer size, but is not limited thereto. For example, the metal catalyst may include a member selected from the group consisting of Pt, Pd, Ni, Au, Ag, Cu, Ru, Rh, Ir, Fe, and combinations thereof, but is not limited thereto.

In accordance with an example embodiment, the metal oxide support may have a particle form in a nanometer to micrometer size and may have pores in a nanometer unit, without being limited thereto. The metal oxide support may have a mesoporous structure form, a rod form, a fiber form, or a tube form, but is not limited thereto.

For example, the metal oxide may include an oxide containing at least one species of a metal selected from the group consisting of a transition metal, a non-transition metal and combinations thereof; or the metal oxide may include a metal oxide doped with a member selected from the group consisting of a non-metal element, an alkali metal, an alkali earth metal and combinations thereof, but is not limited thereto. For example, the metal oxide may be a metal oxide that absorbs light of a region including visible light, ultraviolet light, infrared light, or combinations thereof, but is not limited thereto. Non-limiting examples for the metal oxide may include a member selected from the group consisting of: $TiO_2$, ZnO, $Ta_2O_5$, $ZrO_2$, $WO_3$, an iron oxide, a manganese oxide, a copper oxide, a cobalt oxide, a nickel oxide, a chrome oxide, a molybdenum oxide, a vanadium oxide, a indium oxide, a lead oxide, $ZnCrO_4$, $ZnFe_2O_4$, $MnTiO_3$, $CaTiO_3$, $BaTiO_3$, $SrTiO_3$, $BiVO_4$, $Pb_4Ti_3$, $CdIn_2O_4$, $Fe_2TiO_5$, $CrNbO_4$, $Cr_2Ti_2O_7$; the metal oxide described above which is doped with N, P, As, C, Y, V, Mo, Cr, Cu, Al, Ta, B, Ru, Mn, Fe, Li, Nb, In, Pb, Ge, C, N, S, Sb or combinations thereof; and combinations thereof.

Figure 5:
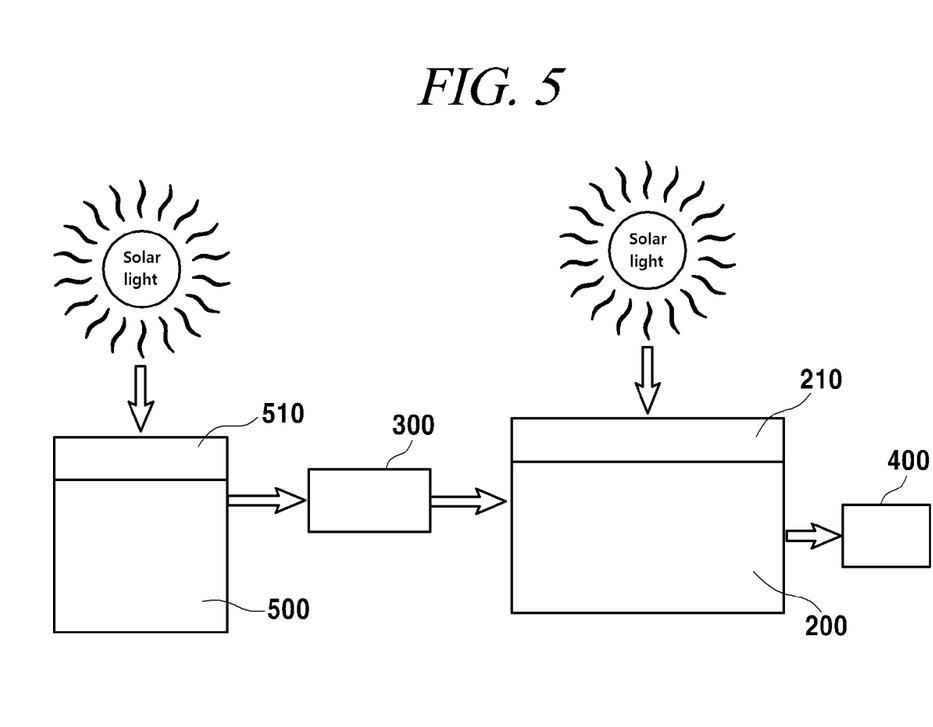
FIG. 5 is a schematic diagram of an apparatus for a reduction reaction of carbon dioxide in accordance with an example embodiment.
Figure 6:
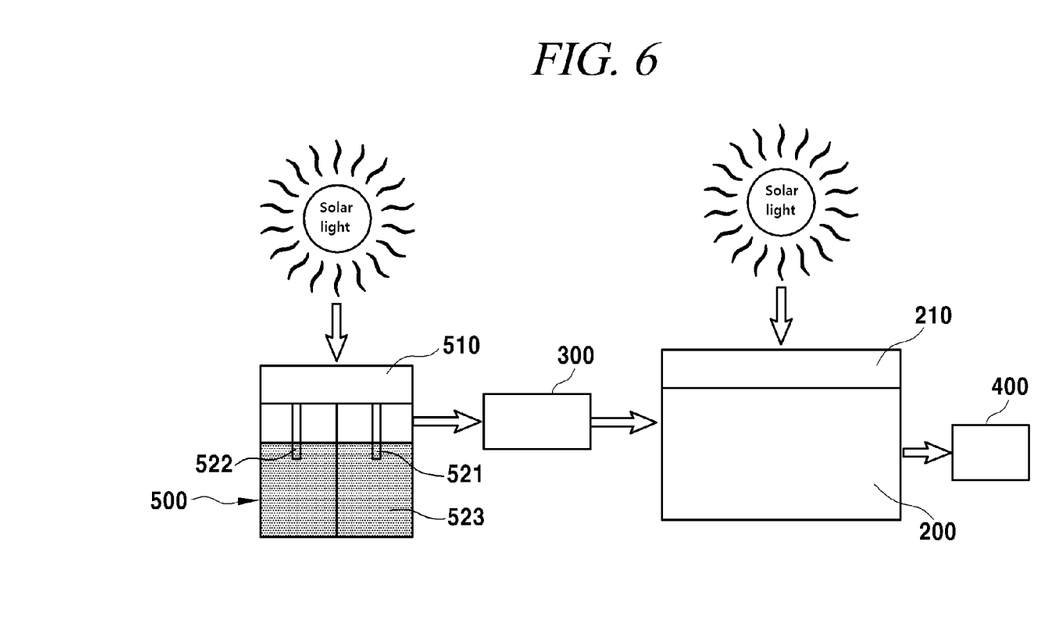
FIG. 6 is a schematic diagram of an apparatus for a reduction reaction of carbon dioxide in accordance with an example embodiment.

The apparatus and the method for reducing carbon dioxide using solar light in accordance with an example embodiment are specifically described with reference to FIG. 5 to FIG. 7.

In the apparatus for a reduction reaction of carbon dioxide in accordance with an example embodiment, the reduction reaction member of carbon dioxide 200, in which the photocatalyst 210 has been loaded, may be connected to the reactant supplying member 300. The water-splitting reaction member 500 including the solar cell 510 may be connected to the reactant supplying member 300. The apparatus for a reduction reaction of carbon dioxide may further include the product outlet member 400 (refer to FIG. 5).

The water-splitting reaction member 500 contains water. The solar cell 510 included in the water-splitting reaction member 500 operates by incidence of solar light, and the water is split into hydrogen gas and oxygen gas by currents generated by the solar cell 510. The separated hydrogen gas is injected into the reduction reaction member of carbon dioxide 200 via the reactant supplying member 300, and carbon dioxide gas is injected into the reduction reaction member of carbon dioxide 200 by the reactant supplying member 300. The hydrogen gas and the carbon dioxide gas are reacted with each other in the presence of the photocatalyst 210 loaded into the reduction reaction member of carbon dioxide 200, and the carbon dioxide gas is reduced so that liquid fuels such as CO, hydrocarbons, ketones, aldehydes, alcohols, etc. may be produced, without being limited thereto. The produced liquid fuels may be discharged through the product outlet member 400. The reaction within the reduction reaction member of carbon dioxide 200 may be presented, for example, as Reaction Formulas 1 and 2 below, but is not limited thereto.

$$CO_2 + 4H_2 \rightarrow CH_4 + 2H_2O \quad \text{[Reaction Formula 1]}$$

$$CO_2 + H_2 \rightarrow CO + H_2O \text{ (first reaction)}$$

$$CO + 2H_2 \rightarrow CH_3OH \text{ (second catalyst reaction)} \quad \text{[Reaction Formula 2]}$$

The solar cell 510 may be connected to a first electrode 521 and a second electrode 522. The first electrode 521 and the second electrode 522 may be connected to the water 523 to split the water 523 into a hydrogen gas and an oxygen gas (refer to FIG. 6). Specifically, solar light is irradiated to the solar cell 510 of the water-splitting reaction member 500 so that a photoelectromotive force is generated from the solar cell 510. The generated photoelectromotive force is applied to the water 523 by the first electrode 521 and the second electrode 522, so that the water 523 is split into hydrogen ions ($H^+$) and oxygen ions ($O^{2-}$). Simultaneously, the oxygen ions are oxidized on a surface of the second electrode 522 so that an oxygen gas ($O_2$) is generated. The generated oxygen gas may be discharged into the air, or may be separately collected to be used for other purposes. The hydrogen ions move toward the first electrode 521, and are reduced on the surface of the first electrode 521 so that a hydrogen gas is generated. The solar cell 510 is not limited and may be, for example, a silicon solar cell, a dye-sensitized solar cell, a compound semiconductor solar cell, and an organic molecule junction solar cell, etc., but is not limited thereto.

In accordance with an example embodiment, the water-splitting reaction member 500 may be connected to a converter (not illustrated) that converts seawater into fresh water, and the water 523 may be fresh water converted in the converter (not illustrated), without being limited thereto. The converter (not illustrated) may desalinate seawater through a reverse osmosis method or a vaporization method, but is not limited thereto. For example, the converter (not illustrated) may include a vaporizer that vaporizes seawater, a condenser that liquefies vaporized steam, a solar collector, and a heat storage tank that stores solar heat. Within the converter (not illustrated), the seawater is circulated and heated within the heat storage tank heated by solar energy absorbed by the solar collector. The heated seawater may be vaporized in the vaporizer to form steam, and the steam may be liquefied in the condenser to be converted into fresh water. The fresh water converted in the converter may be injected into the water-splitting reaction member 500.

Figure 7:
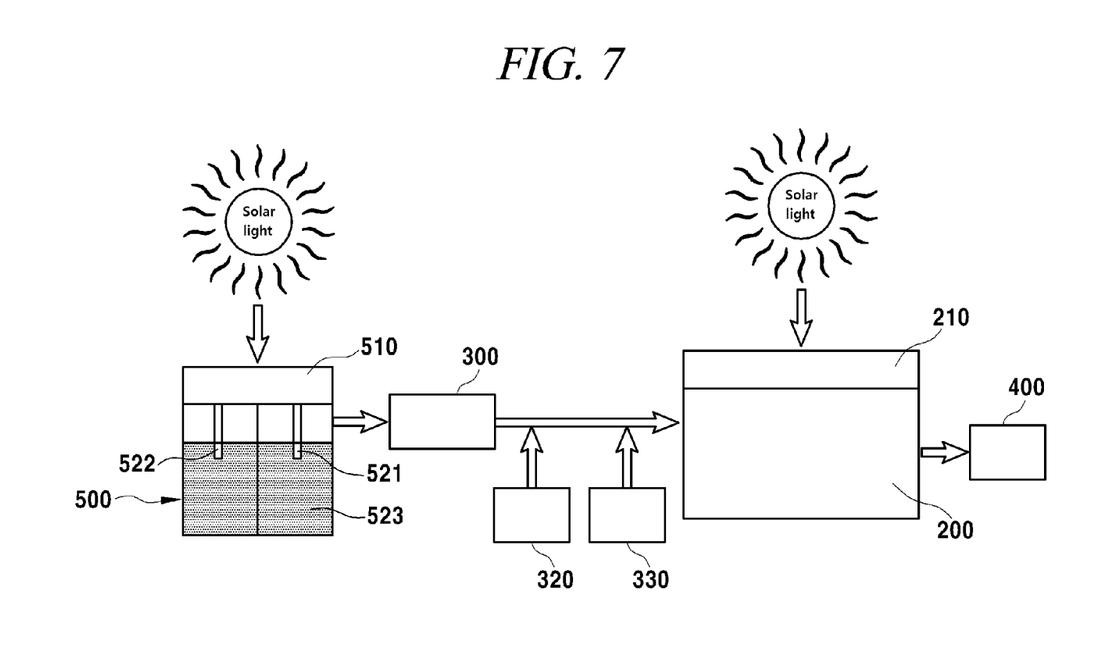
FIG. 7 is a schematic diagram of an apparatus for a reduction reaction of carbon dioxide in accordance with an example embodiment.

In accordance with an example embodiment, the reactant supplying member 300 may further include a carbon dioxide gas supplier 320 and a water supplier 330 (refer to FIG. 7). Carbon dioxide gas may be injected into the reduction reaction member of carbon dioxide 200 by the carbon dioxide gas supplier 320, to be reacted with a hydrogen gas under the presence of the photocatalyst 210. Water may be additionally supplied to the reduction reaction member of carbon dioxide 200 by the water supplier 330, so that the hydrogen gas and the carbon dioxide gas can be more easily reacted with each other. An amount of the water to be additionally supplied may be above approximately 0 ppm to approximately 100 ppm or less based on a total volume of the hydrogen gas and the carbon dioxide gas to be supplied to the reduction reaction member of carbon dioxide 200, but is not limited thereto. The water to be additionally supplied may be sprayed or supplied in a steam form into the inside of the reduction reaction member of carbon dioxide 200, but is not limited thereto.

For the photocatalyst 210, any catalyst material, which is known as a photocatalyst in the art of the present disclosure and has reduction activity of carbon dioxide under irradiation of light, may be used without limitation. The photocatalyst 210 may include, for example, a metal compound, but is not limited thereto.

In accordance with an example embodiment, the metal compound may include, for example, a member selected from the group consisting of a metal oxide, a metal carbide, a metal oxycarbide, and combinations thereof, but is not limited thereto. The metal oxide may include an oxide containing at least one species of a metal selected from the group consisting of a transition metal, a non-transition metal, and combinations thereof, and may be doped with a member selected from the group consisting of a non-metal element, an alkali metal, an alkali earth metal, and combinations thereof, but is not limited thereto. For example, the metal oxide may include a member selected from the group consisting of: $TiO_2$, $ZnO$, $Ta_2O_5$, $ZrO_2$, $WO_3$, an iron oxide, a manganese oxide, a copper oxide, a cobalt oxide, a nickel oxide, a chrome oxide, a molybdenum oxide, a vanadium oxide, an indium oxide, a lead oxide, $ZnCrO_4$, $ZnFe_2O_4$, $MnTiO_3$, $CaTiO_3$, $BaTiO_3$, $SrTiO_3$, $BiVO_4$, $Pb_4Ti_3$, $CdIn_2O_4$, $Fe_2TiO_5$, $CrNbO_4$, $Cr_2Ti_2O_7$; the metal oxide described above which is doped with N, P, As, C, Y, V, Mo, Cr, Cu, Al, Ta, B, Ru, Mn, Fe, Li, Nb, In, Pb, Ge, C, N, S, Sb, or combinations thereof; and combinations thereof, but is not limited thereto.

The metal carbide may include SiC or a carbide of a transition metal, and the metal oxycarbide may include SiOC or an oxycarbide of a transition metal, without being limited thereto.

In accordance with an example embodiment, the photocatalyst 210 may further include a metal particle, but is not limited thereto. The metal particle may have a nanometer size, and may include, for example, a member selected from the group consisting of Fe, Ru, Rh, Co, Ir, Os, Pt, Pd, Ni, Au, Ag, Cu, Co, Zn, Ti, V, Mn, Sn, In, Pb, Cd, Ga and combinations thereof, but is not limited thereto.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

I claim:

1. An apparatus for a reduction reaction of carbon dioxide, comprising:
    a solar collecting member that absorbs solar heat energy;
    a reduction reaction member of carbon dioxide, heated by solar heat energy; and
    a reactant supplying member and a product outlet member, which are connected to the reduction reaction member of carbon dioxide,
    wherein hydrogen gas and carbon dioxide gas are injected into the reduction reaction member of carbon dioxide via the reactant supplying member to be reacted with each other in the presence of a metal catalyst supported on a metal oxide support loaded into the reduction reaction member of carbon dioxide, and
    wherein the reduction reaction member of carbon dioxide includes an outer wall which provides a vacuum state within the outer wall.

2. The apparatus for a reduction reaction of carbon dioxide of claim 1, further comprising a water-splitting reaction member.

3. The apparatus for a reduction reaction of carbon dioxide of claim 2,
    wherein the water-splitting reaction member generates oxygen and hydrogen through splitting of water by a solar cell, the generated oxygen is removed, and the generated hydrogen is supplied into the reduction reaction member of carbon dioxide.

4. The apparatus for a reduction reaction of carbon dioxide of claim 2,
    wherein the water-splitting reaction member converts seawater into fresh water and generates oxygen and hydrogen through splitting of the fresh water by a solar cell, the generated oxygen is removed, and the generated hydrogen is supplied into the reduction reaction member of carbon dioxide.

5. The apparatus for a reduction reaction of carbon dioxide of claim 1,
    wherein the reactant supplying member includes a carbon dioxide gas supplier and a hydrogen gas supplier.

6. The apparatus for a reduction reaction of carbon dioxide of claim 1, further comprising a water supplier connected to the reduction reaction member of carbon dioxide.

7. The apparatus for a reduction reaction of carbon dioxide of claim 1,
    wherein the solar collecting member that absorbs solar heat energy includes a solar light collector.

8. The apparatus for a reduction reaction of carbon dioxide of claim 1,
    wherein the solar collecting member is manufactured by using a solar light absorbing material or subject to surface treatment by using a solar light absorbing material.

9. The apparatus for a reduction reaction of carbon dioxide of claim 1,
    wherein the metal catalyst is in a metal particle form.

10. An apparatus for a reduction reaction of carbon dioxide, comprising:
    a reduction reaction member of carbon dioxide, in which a photocatalyst is loaded; and
    a reactant supplying member and a product outlet member, which are connected to the reduction reaction member of carbon dioxide,
    wherein carbon dioxide gas and hydrogen gas are injected into the reduction reaction member of carbon dioxide via the reactant supplying member to be reacted with each other within the reduction reaction member of carbon dioxide under irradiation of solar light on the photocatalyst, and
    wherein the reduction reaction member of carbon dioxide includes an outer wall which provides a vacuum state within the outer wall.

11. The apparatus for a reduction reaction of carbon dioxide of claim 10, further comprising a water-splitting reaction member.

12. The apparatus for a reduction reaction of carbon dioxide of claim 11,
    wherein the water-splitting reaction member generates oxygen and hydrogen through splitting of water by a solar cell, the generated oxygen is removed, and the generated hydrogen is supplied into the reduction reaction member of carbon dioxide.

13. The apparatus for a reduction reaction of carbon dioxide of claim 11,
    wherein the water-splitting reaction member converts seawater into fresh water and generates oxygen and hydrogen through splitting of the fresh water by a solar cell, the generated oxygen is removed, and the generated hydrogen is supplied into the reduction reaction member of carbon dioxide.

14. The apparatus for a reduction reaction of carbon dioxide of claim 10,
wherein the reactant supplying member includes a carbon dioxide gas supplier and a hydrogen gas supplier.

15. The apparatus for a reduction reaction of carbon dioxide of claim 10, further comprising a water supplier connected to the reduction reaction member of carbon dioxide.

16. The apparatus for a reduction reaction of carbon dioxide of claim 10,
wherein the photocatalyst further includes a metal particle.

17. A reducing method of carbon dioxide, comprising:
loading a photocatalyst into a reduction reaction member of carbon dioxide including a reactant supplying member;
splitting water into hydrogen gas and oxygen gas in a water-splitting reaction member, which includes a solar cell and is connected to the reactant supplying member; and
injecting the hydrogen gas and carbon dioxide gas into the reduction reaction member of carbon dioxide via the reactant supplying member to react the hydrogen gas and the carbon dioxide gas with each other under irradiation of solar light on the photocatalyst, and
wherein the reduction reaction member of carbon dioxide includes an outer wall which provides a vacuum state within the outer wall.

18. A reducing method of carbon dioxide, comprising:
loading a metal catalyst into a reduction reaction member of carbon dioxide;
heating the reduction reaction member of carbon dioxide by using solar heat energy transferred from a solar collecting member that absorbs solar heat energy; and
injecting hydrogen gas and carbon dioxide gas into reduction reaction member of carbon dioxide to react the hydrogen gas and the carbon dioxide gas with each other in the presence of the metal catalyst
wherein the reduction reaction member of carbon dioxide includes an outer wall which provides a vacuum state within the outer wall.

* * * * *